United States Patent [19]

Tsai et al.

[11] Patent Number: 5,863,342
[45] Date of Patent: Jan. 26, 1999

[54] STARCHFOAM PRODUCTS WITH IMPROVED FLEXIBILITY/ COMPRESSIBILITY AND THE METHOD OF PREPARATION THEREOF

[75] Inventors: John Tsai, Belle Mead, N.J.;
Christopher L. Kulp, Palmer, Pa.;
Walter Maliczyszyn, Somerville, N.J.;
Paul A. Altieri, Belle Meade, N.J.;
David C. Rawlins, Piscataway, N.J.

[73] Assignee: National Starch and Chemical Investment Holding Corporation, Wilmington, Del.

[21] Appl. No.: 32,608

[22] Filed: Feb. 27, 1998

Related U.S. Application Data

[62] Division of Ser. No. 746,958, Nov. 18, 1996, Pat. No. 5,756,556.

[51] Int. Cl.$^6$ .............................. C08L 5/00; C08B 31/10; C08B 31/02; C08B 30/06
[52] U.S. Cl. .............................. 127/38; 127/71; 106/122; 106/215.2; 106/215.3; 521/84.1; 264/53; 264/54
[58] Field of Search ........................ 127/38, 71; 106/122, 106/215.2, 215.3; 521/84.1; 264/53, 54

[56] References Cited

U.S. PATENT DOCUMENTS

| 5,035,930 | 7/1991 | Lacourse et al. | 428/35.6 |
| 5,043,196 | 8/1991 | Lacourse et al. | 428/35.6 |
| 5,248,702 | 9/1993 | Neumann et al. | 521/84.1 |
| 5,252,271 | 10/1993 | Jeffs | 264/54 |
| 5,314,754 | 5/1994 | Knight | 428/532 |
| 5,756,556 | 5/1998 | Tsai et al. | 524/84.1 |

FOREIGN PATENT DOCUMENTS

| 0 712 883 | 5/1996 | European Pat. Off. | C08J 9/00 |

*Primary Examiner*—David Brunsman
*Attorney, Agent, or Firm*—Eugene Zagarella, Jr.

[57] ABSTRACT

An expanded shaped product with improved flexural compressibility and surface properties comprising starch and a hydrophobically modified acid anhydride or its acid hydrolyzed counterpart and the method of preparing such product by extrusion.

13 Claims, No Drawings

STARCHFOAM PRODUCTS WITH IMPROVED FLEXIBILITY/COMPRESSIBILITY AND THE METHOD OF PREPARATION THEREOF

This application is a division of application Ser. No. 08/746,958, filed on Nov. 18, 1996 now U.S. Pat. No. 5,756,556.

BACKGROUND OF THE INVENTION

This invention relates to expanded or foamed shaped products with good flexural and compressibilityproperties comprising a select combination of starch and a hydrophobically modified acid anhydride or its hydrolyzed acid counterpart and the method of preparation thereof.

The use of plastic and thermoplastic materials such as polystyrene, polyethylene and polyurethane have dominated the custom foam packaging market in recent years. However, because of its biodegradability as well as other favorable environmental characteristics and its ready availability, starch and starch based products have received increased attention in the foam product area.

U.S. Pat. No. 5,035,930 issued Jul. 30, 1991 and U.S. Pat. No. 5,043,196 issued Aug. 27, 1991 disclose the formation of expanded shaped starch products by the extrusion of high amylose starch and include the addition of synthetics, such as polyvinyl alcohol, polyvinyl acetate and polyurethane to improve product properties. U.S. Pat. No. 5,248,702 issued Sep. 28, 1993 discloses expanded starch based products useful as packaging fillers which are fabricated by extrusion of starch in the presence of a particulate bubble nucleating agent such as silicon dioxide and amorphous silica. U.S. Pat. No. 5,314,754 issued May 24, 1994 is directed to a method of producing starch derived shaped articles wherein high amylose starch is extruded under selected temperature and pressure conditions.

European Patent 0 712 883 published May 22, 1996 discloses biodegradable, structural shaped products having good flexibility or rigidity properties which are provided by extruding starch having a selected large particle size and preferably containing a nucleating agent.

U.S. Pat. No. 5,252,271 issued Oct. 12, 1993 discloses a biodegradable packaging foam which is provided by extruding a non-modified starch which is admixed with a selected mild acid, water and a carbonate composition.

The state of the art, as exemplified above, has shown many different approaches to forming starch based foam products. However, because of the nature and characteristics of starch it has been difficult to produce foamed starch products which have good flexural, compressibility and surface properties such as gloss, smoothness and uniformity. Additionally, because of the various products and the many different types of applications available, there is always the need for improved products and methods of preparation. This is particularly true in the preparation of starch foam used in the formation of sheets, shapes and planks for packaging applications which require increased flexibility.

SUMMARY OF THE INVENTION

Now it has been found that foamed shaped products with good flexural, compressibility and surface properties are provided by expanding a composition comprising starch and a hydrophobically modified acid anhydride or its hydrolyzed acid counterpart.

In one embodiment of this invention, starch and particularly an alkylene oxide modified starch is extruded with a cyclic dicarboxylic acid anhydride and particularly hydrophobically modified succinic anhydride or its hydrolyzed acid counterpart to form starch foamed products with good flexibility, compressibility and surface properties.

DETAILED DESCRIPTION OF THE INVENTION

The ability to provide foamed shaped starch products having good flexural, compressibility and surface properties making them useful in packaging and various other applications is a main objective of this invention.

The starting starch material useful in this invention may be any of several starches, native or modified. Such starches include those derived from any plant source including corn, potato, wheat, rice, sago, tapioca, waxy maize, sorghum and high amylose starch, i.e., starch having at least 40% and more particularly at least 65% by weight of amylose content, such as high amylose corn, etc. Starch flours may also be used as a starch source. Also included are the conversion products derived from any of the former bases including, for example, dextrin prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches.

Modified starches are particularly useful in this invention. By modified it is meant that the starch can be derivatized or modified by typical processes known in the art, e.g., esterification, etherification, oxidation, acid hydrolysis, crosslinking and enzyme conversion. Typically, modified starches include esters, such as the acetate and half-esters of dicarboxylic acids, particularly the alkenylsuccinic acids; ethers, such as the hydroxyethyl and hydroxypropyl starches and cationic starches such as starch modified with 2-diethylaminoethyl chloride (DEC) and starch modified with quaternary ammonium reagents such as 3-chloro-2-hydroxypropyltrimethylammonium chloride; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, Edited by Roy L. Whistler, et al., chapter X; Starch Derivations: Production and Uses by M. W. Rutenberg, et al., Academic Press, Inc. 1984.

One modification of the starches that is especially useful in this invention is the etherification with alkylene oxides, particularly those containing 2 to 6, preferably 2 to 4 carbon atoms. Ethylene oxide, propylene oxide and butylene oxide are exemplary compounds that are useful in etherifying the starting starch materials, with propylene oxide being especially preferred. Varying amounts of such compounds may be used depending on the desired properties and economics. Generally, up to 15% or more, more particularly 1 to 15%, and preferably, up to, about 10%, more particularly 1 to 10%, by weight, based on the weight of starch will be used.

Another modification of the starches that is especially useful in this invention is esterification where the ester component has 2 to 8 carbon atoms. More particularly, the starch ester will comprise compounds having the formula:

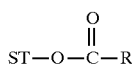

where ST is the starch base material and R is an alkyl, aryl, alkaryl or aralkyl of 1 to 7 carbon atoms, preferably 1 to 4 carbon atoms. More preferably, the ester compound will have an R group which is an alkyl of 1 to 4 carbon atoms. Starch esters of this type include starch acetate, starch propionate and starch butyrate. The starch esters are typically prepared by reacting starch with organic acid anhydrides such as acetic anhydride and desirably have a degree of substitution (DS) of from about 0.3 to 2.2 and preferably from about 0.7 to 2.0.

In forming the foamed shaped products of this invention the selected starch starting material is combined with a hydrophobically modified acid anhydride or its hydrolyzed acid counterpart and more particularly a cyclic dicarboxylic acid anhydride represented by the following formula and its hydrolyzed acid counterpart:

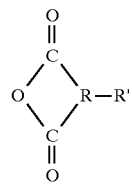

wherein R represents a diethylene or trimethylene radical and wherein R' is a hydrophobic group containing at least 8 carbon atoms and particularly 8 to 30 carbon atoms which may be selected from the class consisting of alkyl, alkenyl, aralkyl, alkaryl, alkenaryl or aralkenyl groups. The hydrolyzed acid form of this anhydride can be used as noted previously. Compounds in which R' contains at least 12 particularly 12 to 21 carbon atoms are preferred as well as those having an alkenyl group. The preferred R group is diethylene.

It is noted that reference to the hydrolyzed acid counterpart of the anhydride as described above and throughout this application is directed to compounds having the formula:

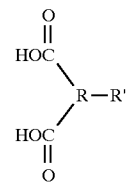

where R and R' are the same as defined above for the anhydride. It is further noted that reference to anhydride and/or its hydrolyzed acid counterpart is intended to include use of either the anhydride or acid counterpart alone or a mixture of anhdyride or hydroyzed acid such as when the anhydride is partially hydrolyzed.

The hydrophobically modified anhydride and/or its hydrolyzed acid counterpart is combined with the starch in an amount of from about 0.1 to 10% by weight of anhydride (or acid) and preferably about 0.5 to 4% anhydride (or acid) based on the dry weight of starch. The anhydride or hydrolyzed acid is usually added in the form of an aqueous emulsion and is co-extruded with the starch by adding it directly to the extruder. However, the anhydride or hydrolyzed acid itself that is not emulsified, may be mixed with the starch to form a one-part product prior to processing. This may be accomplished by adding the anhydride or hydrolyzed acid to the aqueous modified or unmodified starch slurry at various points and times. It may even be added during the process of preparing the modified starch. Starch foam products made using a one-part product, i.e., adding anhydride or hydrolyzed acid directly to the starch slurry prior to processing gives products of comparable quality to those obtained through direct addition of an anhydride/acid emulsion to the extruder (See Example 5). Dry-blending of the starch base with the anhydride or its hydrolysis product (acid) is also possible as a preparative technique as well as solubilization of the anhydride and/or acid in organic media via a non-aqueous starch slurry process. The anhydride or acid emulsion itself can also be pre-blended with the starch using these same techniques.

When using an aqueous emulsion, sufficient water is added to the anhydride or acid to provide an emulsion containing such anhydride or acid. Thus, the concentration of the anhydride or acid emulsion used will vary depending on the amount of the anhydride or acid desired in the extrusion process. More particularly, the aqueous emulsion will contain from about 1 to 60% by weight and preferably about 15 to 45% by weight of anyhydride or acid. While the anhydride emulsion can be added and used immediately in the extruder, it can also be used after a short setting period of, for example, two hours or more, which allows the anhydride to hydrolyze or partially hydrolyze to the acid form. Surfactants and emulsifying aids are generally used in the emulsification procedure and they may include a non-ionic species such as fatty acid alkoxylates, polyethylene glycol derivatives (e.g., alkyl phenol alkoxylates) and carboxylic esters. Anionic surfactants such as sulfosuccinates and phosphate esters; cationic surfactants such as quaternary ammonium compounds and amphoteric surfactants such as propionates and betaines containing both quaternary nitrogen functional groups and carboxylic functional groups may also be used to effectively prepare the emulsions.

While any starch may be used in this invention as noted previously, the starch materials that are particularly useful in this invention are corn, potato, tapioca and high amylose starch; i.e., starch containing at least 40% by weight and preferably at least 65% by weight of amylose. Further preferred are the starches that are modified by etherification with alkylene oxides, particularly the alkylene oxide modified corn, potato, tapioca and high amylose starches such as high amylose corn starch.

Blends of two or more of the starch starting materials may be used as well as additive or synthetic compounds to improve properties such as water resistance, strength, flexibility, color, etc. Compounds such as polyvinyl alcohol, ethylene/vinyl alcohol, polyvinyl acetate, poly(ethylene/vinyl acetate), mono-glycerides, styrene acrylate resins are typical additives which may be used. These additives may be used in any amount that will effectively satisfy the desired property, provided the extrusion of the starch and the overall properties of the expanded product are suitable. Generally, up to about 50% by weight of such additives, and preferably up to about 10% by weight, may be used.

The expanded shaped products of this invention are prepared using an extrusion process. The apparatus used in carrying out the extrusion process may be any screw type extruder. While the use of a single or twin screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Variations in any of the elements used in the extruder may be made as desired in accordance with conventional design practices. A further description of extrusion and typical design variations can be found in "Encyclopedia of Polymer Science and Engineering", Volume 6, 1986, pp. 571 to 631.

In carrying out the extrusion process, temperatures in the extruder will vary depending on the particular material, desired properties and application. They can generally range from about 100° to 250° C. and preferably will range from about 150° to 210° C. The total moisture content of the starch in the extruder, i.e., moisture present in the inlet feed starch as well as water in the aqueous anhydride and/or acid emulsion plus water added during processing, will be about 25% or less by weight, based on the weight of starch. More particularly, the total moisture content of the starch will range from about 8 to 25% preferably about 10 to 21% and more preferably from about 15 to 21% by weight, based on the weight of starch.

In providing good extrusion properties, it has often been found helpful, as described in EP 0 712 883 noted previously, to use a starch feed material wherein the starch has a defined large particle size of from about 400 to 1500 microns and more particularly from about 800 to 1200 microns. When using such starch feed material, extrusion processing conditions such as feed rate and pressure plus desirable cell structure in the formed product are more readily attainable. In order to obtain the starch feed material having such a desired particle size, a method known as compact granulating commonly referred to as chilsonating, has been found especially useful.

Another feature which improves processing and the properties of the resulting structured starch products, and which may be used in this invention is described in the aforementioned EP 0 712 883, and is the addition of a nucleating agent or salt to the starting starch feed material. This is especially helpful when dies of increased and large open areas or cross section are used and particularly improves the cell structures of the expanded product. Various nucleating agents or salts may be used in this capacity including any inorganic, water soluble salt or mixtures thereof and especially an alkali metal or alkaline earth metal salt such as sodium sulfate and sodium chloride. Other nucleating agents such as microtalc can be used but the alkali metal or alkaline earth metal salts are preferred. The amount of nucleating agent used will depend on particular processing conditions and desired extruded product dimensions with at least 1%, more particularly from 1 to 8% and preferably from 1% to 6% by weight of nucleating agent, based on the weight of starch in the feed composition, being used. It is further noted that the nucleating agent or salt can be added to the feed starch or in certain circumstances may be present as residual salt or ash content in the already prepared starch.

The expanded or foamed starch products of this invention are prepared by extrusion and generally have a closed cell structure with relatively low density, good surface properties such as gloss, smoothness and uniformity, and good flexibility as well as resilience and compressibility. The uniform closed cell structure of the expanded product helps to give it desired properties. A closed cell structure is defined as one having largely non-connecting cells, as opposed to open cells which are largely interconnecting or defined as two or more cells interconnected by broken, punctured or missing cell walls. Typically the tiny bubble formation results in a small cell size of about 50 to 1000 microns.

Generally properties of the expanded foamed product will vary widely with the bulk density of.the product being from about 0.1 to 16 lb/ft$^3$, the resiliency at least 20%, more particularly at least 50%, and the compressibility from about 100 to 800 g/cm$^2$. The bulk density can be determined by the volume displacement method described by M. Hwang and H. Hayakawa in "Bulk Densities of Cookies Undergoing Commercial Baking Process", Journal of Food Science, Vol. 45, 1980, pp. 1400–1407. The resilience and compressibility can be determined using a Stevens LFRA Texture Analyzer. Descriptions of these methods can be found in U.S. Pat. No. 5,043,196 issued Aug. 27, 1991, which is incorporated herein by reference.

Flexural and compressibility properties of the starch foamed products can be obtained using an Instron Tester and ASTM procedures D 1621-94 and D 790-92.

This invention is further illustrated by the following examples with all parts and percentages given by weight and all temperatures in degrees Celsius unless otherwise noted.

EXAMPLE 1

Starch samples were extruded in a Werner and Pfleiderer twin screw extruder, model ZSK 30. The starch material used was a high amylose corn starch (~70% amylose) modified with propylene oxide (7%).

An aqueous emulsion of alkenyl succinic anhydride (ASA mixture of $C_{16}$–$C_{18}$) was prepared by mixing 142.0 g of the anhydride (ASA) with 7.12 g of Surfonic N-95 (5% on ASA), a nonyl phenol ethoxylate surfactant, using a magnetic stir bar for five minutes. This ASA surfactant mixture was then combined with 300 g of distilled water in a Waring blender and emulsified for one minute at high speed (~20,000 rpm). This white aqueous emulsion was subsequently diluted to 740 g total weight with additional water giving a final emulsion of 19.19% ASA.

The emulsion was added to the extruder along with the starch feed material. The extruder and processing variables were as follows:

TABLE 1

| Extrusion Processing Variables | |
| --- | --- |
| Barrel Length | 7 barrels (L/D = 21) |
| Screw Configuration | SC7-8A |
| Die Design | 1 × 3 mm opening |
| Screw Speed | 250 rpm |
| Starch Feed Rate | 10 kg/hour |
| Barrel Zone Temperature | off/off/80° C./180° C./180° C. feed barrel H$_2$O cooled |

The ASA emulsion was fed to the extruder at a rate of 12.19 g/min. With the feed starch having about 10.2% moisture content, and with the addition of aqueous emulsion and trim water, the resulting moisture content of the starch was calculated to be 17%. Samples of starch were extruded into cylindrical extrudates under these conditions including a control Sample D (no ASA or anhydride addition), Sample A, where the anhydride containing emulsion was added immediately after preparation and Samples B and C where the anhydride emulsion was allowed to stand for two hours resulting in hydrolysis to the acid. The resulting foam samples were stored in constant humidity cabinets and then analyzed for resiliency and flexibility using a Stevens Texture analyzer. For resiliency, a "spring-back" value for the foam under constant force is monitored; for compressibility, a flexibility value (smaller number=higher flexibility) representing the amount of force required to deform the sample. The results given below show the formed products of this invention with good cell structure, increased low and high humidity resistance and increased flexibility, compressibility and resiliency.

TABLE 2

| Sample (ASA/Acid %) | % Resiliency (2 min)[1] | Compressibility (2 min)[1] | % Resiliency (2 min)[2] | Compressibility (2 min)[2] |
|---|---|---|---|---|
| A (1.7% anhydride) | 60.63 | 484 | 70.42 | 720 |
| B (1.7% acid) | 59.91 | 509 | 69.85 | 740 |
| C (1.7% acid) | 60.77 | 561 | 69.85 | 740 |
| D control (0) | 59.35 | 654 | 67.24 | 884 |

[1] 23° C./50% Relative humidity (after 48 hours)
[2] 23° C./10% Relative humidity (after 48 hours)

EXAMPLE 2

Similar starch samples were formed by extrusion as in Example 1 using different treatment levels of alkenyl succinic acid. Results are given below:

TABLE 3

| Sample (ASA/Acid %) | % Resiliency (2 min)[1] | Compressibility (2 min)[1] | % Resiliency (2 min)[2] | Compressibility (2 min)[2] |
|---|---|---|---|---|
| A (2.0% acid) | 62.26 | 586 | 68.84 | 703 |
| B (2.5% acid) | 63.73 | 584 | 70.91 | 713 |
| C (2.5% acid) | 67.06 | 561 | 68.41 | 670 |
| D (3.0% acid) | 62.64 | 536 | 70.18 | 652 |
| E (4.0% acid) | 61.29 | 470 | 71.91 | 667 |
| F control (0) | 59.35 | 654 | 67.24 | 884 |

[1] 23° C./50% Relative humidity (after 48 hours)
[2] 23° C./10% Relative humidity (after 48 hours)

EXAMPLE 3

Several starch samples were extruded into foam sheets using a circular tube die (O.D. of 16.5 mm., I.D of 15 mm. and opening of 1.5 mm) and the process conditions and composition of Example 1 (i.e., modified starch+ASA) as well as a control of the same starch without ASA. The expanded starch products were evaluated for mechanical properties using an Instron tester with the results (average of 5 replicate samples) shown below: The test involved ASTM D 790-92 with 3-point and 4-point bending tests performed and a flexural modulus value obtained directly from the Instron tester. The results show a significant decrease in the flexural modulus for the foam starch product of this invention which contained ASA as compared to the control starch product which did not contain ASA.

TABLE 4

| Sample | Displacement at Yield (min) | Strain at Yield (mm/mm) | Load at Yield (KN) | Stress at Yield (MPa) | Modulus Flexural (MPa) |
|---|---|---|---|---|---|
| Starch + ASA | 11.18 | 0.0436 | 0.0009 | 0.2430 | 6.417 |
| Control (No ASA) | 16.12 | 0.0397 | 0.0019 | 0.5305 | 20.60 |

EXAMPLE 4

A foamed starch product was prepared by extrusion using the same procedure as described in Example 1 with corn starch modified by 5% propylene oxide and combined with 2% of alkenyl ($C_{16}$–$C_{18}$) succinic acid (ASA). The product produced was evaluated for mechanical properties using an Instron 4465 tester and ASTM procedure D 1621-94. Compression module values were obtained directly form the Instron tester and the toughness value was obtained by multiplying the stress at yield value by the strain at yield value (taken as a percent) for each sample. The results given below show desirable results of both a decrease in modulus and an increase in toughness relative to the control (i.e., starch without ASA) without sacrificing other physical properties typical of high quality foams, i.e., good bulk density, good expansion, etc.

TABLE 5

| Sample | ASA Amount (%) | Compressive Modulus (MPa) | Toughness |
|---|---|---|---|
| Corn starch (5% propylene oxide) | 2 | 0.2944 | 7.21 |
| Control[1] | 0 | 0.845 | 6.81 |

[1] high amylose corn starch (70% amylose) modified with 7% propylene oxide

EXAMPLE 5

This sample illustrates the formation of a foamed product as in Example 1using the direct addition of the alkenyl succinic anhydride (ASA) to the starch, i.e., not in emulsion form.

Propylene oxide (7%) in the amount of 77 g was added to 1,100 g of high amylose corn starch (70% amylose) in an aqueous slurry comprising 187 g (17%) sodium sulfate and 16.5 g (1.5%) sodium hydroxide. Following reaction of propylene oxide on starch at 40° C. for 16 hours, 22 g (2%) of alkenyl ($C_{16}$–$C_{18}$) succinic anhydride was added to the agitating slurry and mixed for 2.5 hours at 40° C. The starch slurry was cooled and the residual propylene oxide neutralized at a pH of 3.0 for 1 hour. The pH of the slurry was adjusted and the slurry centrifuged, flash dried and extruded into foam pieces. Mechanical properties were evaluated using an Instron tester as described in Example 4 with the results shown below:

TABLE 6

| Sample | Compressive Modulus (MPa) | Toughness |
|---|---|---|
| Starch with 2% ASA added to slurry | 1.336 | 8.39 |
| Control - starch without ASA[1] | 2.184 | 6.81 |

[1] high amylose corn starch (70% amylose) modified with 7% propylene oxide

EXAMPLE 6 (COMPARATIVE)

This example illustrates attempts to form starch products as in this invention using non-hydrophobically modified succinic anhydride or succinic acid and also citric acid, through co-extrusion of the feed starch with an aqueous additive as in Example 1.

Extrusion of starch with a succinic anhydride solution was not possible as this compound is very slightly soluble in water. The hydrolysis product of succinic anhydride, i.e., succinic acid is totally insoluble in water and also cannot be extruded with starch in this manner.

An aqueous citric acid solution was prepared and co-extruded with starch (7% propylene oxide treated high amylose corn starch) as in Example 1. This foamed starch did not have satisfactory properties, as it was overly expanded, had very large cell structure and exhibited poor cushioning properties.

What is claimed is:

1. The method of preparing an expanded shaped product comprising extruding starch with from about 0.1 to 10% by weight based on the dry weight of starch of a cyclic dicarboxylic acid anhydride having the following formula or its hydrolyzed acid form:

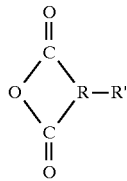

wherein R represents a diethylene or trimethylene radical and R' is a hydrophobic group having 8 to 30 carbon atoms, the extrusion taking place in the presence of a total moisture content of 25% or less by weight and at a temperature of from about 100° to 250° C.

2. The method of claim 1 wherein R is diethylene and R' is selected from the group consisting of alkyl, alkenyl, aralkyl, alkaryl, alkenaryl or aralkenyl.

3. The method of claim 2 wherein the starch is selected from the group consisting of corn, potato, wheat, rice, sago, tapioca, waxy maize, sorghum and high amylose starch and the total moisture content is from about 8 to 25% by weight.

4. The method of claim 3 wherein the anhydride or its hydrolyzed acid is used in the form of an aqueous emulsion.

5. The method of claim 3 wherein the anhydride or its hydrolzyed acid is added to the starch before they are fed to the extruder.

6. The method of claim 2 wherein the starch is selected from the group consisting of corn, potato, tapioca, and high amylose starch.

7. The method of claim 6 wherein the total moisture content is from about 10 to 21% by weight.

8. The method of claim 7 wherein the starch is a modified starch ether or starch ester.

9. The method of claim 7 wherein the starch is modified with up to about 15% by weight of alkylene oxide containing 2 to 6 carbon atoms.

10. The method of claim 9 wherein the feed starch has a particle size of from about 400 to 1500 microns.

11. The method of claim 10 wherein the starch is high amylose starch having an amylose content of at least 40% by weight based on the weight of starch.

12. The method of claim 10 wherein from about 0.5 to 4% of the anhydride is used based on the weight of starch and R' is an alkenyl group of 12 to 21 carbon atoms.

13. The method of claim 12 wherein the starch is corn starch or high amylose corn starch.

* * * * *